F. MEATTAUER.
AUTOMOBILE FENDER.
APPLICATION FILED APR. 1, 1912.
1,120,073.
Patented Dec. 8, 1914.
2 SHEETS—SHEET 1.
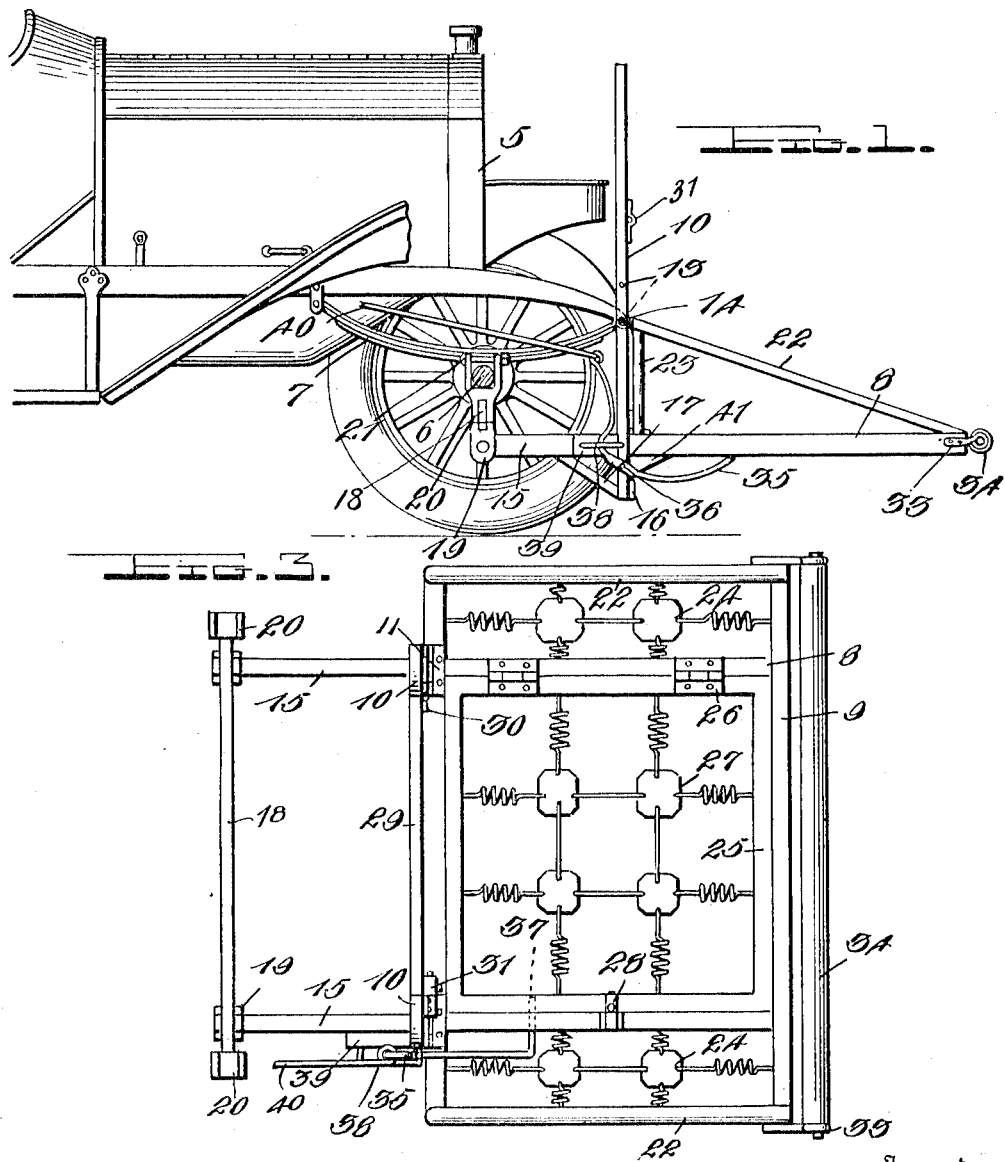
Witnesses
Chas. L. Griesbauer
L. H. Ellis
Inventor
Frank Meattauer,
By Watson E. Coleman,
Attorney

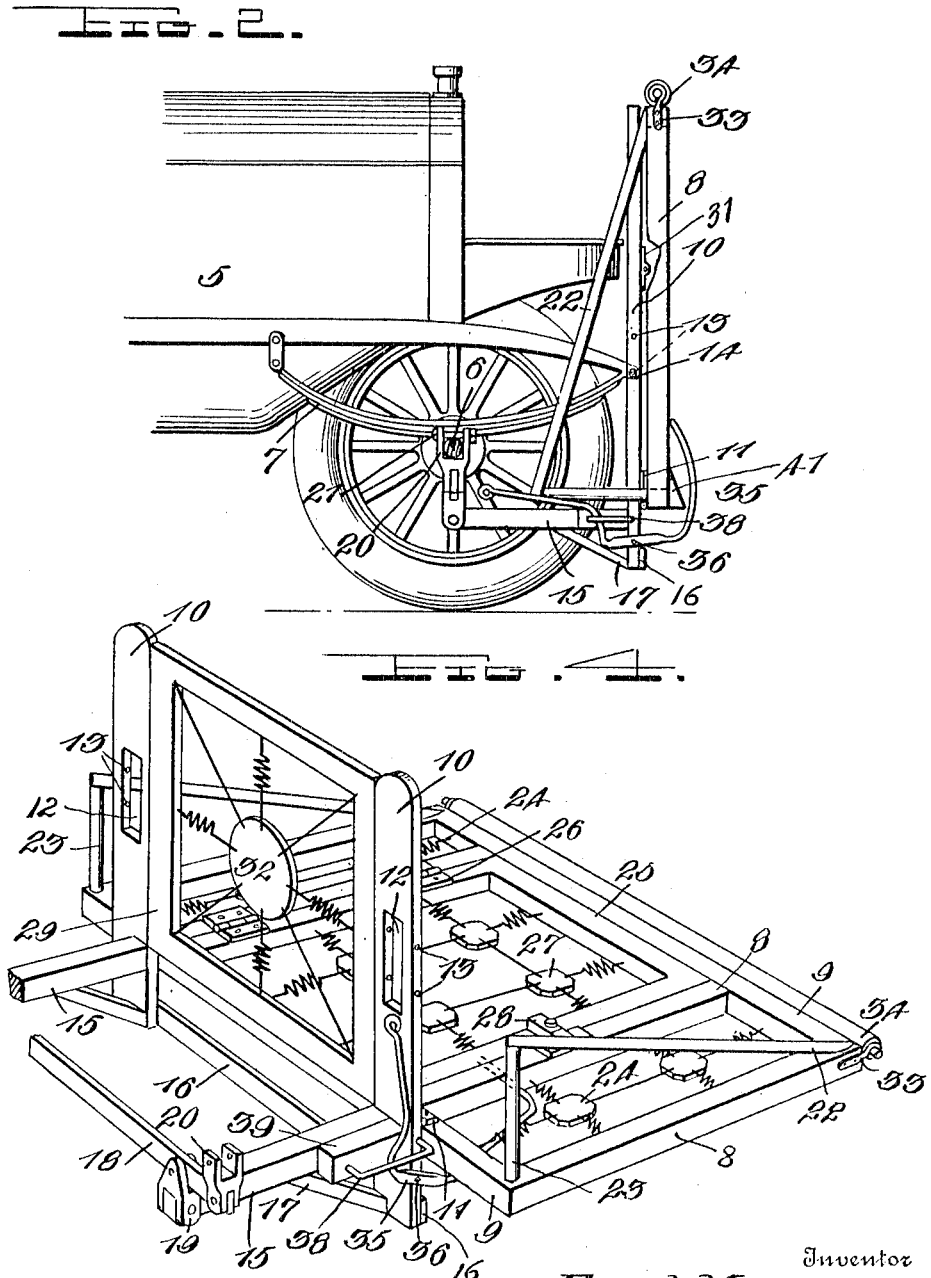

UNITED STATES PATENT OFFICE.

FRANK MEATTAUER, OF LOS ANGELES, CALIFORNIA, ASSIGNOR TO PACIFIC AUTOMOBILE LIFE SAVING FENDER MANUFACTURING COMPANY, OF LOS ANGELES, CALIFORNIA, A CORPORATION.

AUTOMOBILE-FENDER.

1,120,073.  Specification of Letters Patent.  Patented Dec. 8, 1914.

Application filed April 1, 1912. Serial No. 687,651.

*To all whom it may concern:*

Be it known that I, FRANK MEATTAUER, a citizen of the United States, residing at Los Angeles, in the county of Los Angeles and State of California, have invented certain new and useful Improvements in Automobile-Fenders, of which the following is a specification, reference being had to the accompanying drawings.

This invention relates to improvements in automobile fenders and more particularly to a device of that character shown and described in Patent No. 963,306, issued to me July 5th, 1910.

The present invention has for its primary object the provision of a fender which may be readily lowered or raised to its effective or ineffective position.

A further object of the invention is to materially simplify and improve the construction of the fender disclosed in my prior patent and to increase the efficiency thereof.

Still another object of the invention is to devise a fender for application to automobiles which will be inexpensive to manufacture and extremely strong and durable in practical use.

With the above and other objects in view, the invention resides in the novel features of construction, combination and arrangement of parts as will be fully hereinafter described, claimed and illustrated in the accompanying drawings, in which, Figure 1 is a side elevation, illustrating my improved fender applied to an automobile and showing the same in effective position; Fig. 2 is a similar view showing the fender raised to its ineffective position; Fig. 3 is a top plan view; and, Fig. 4 is a perspective view of the fender, removed from the vehicle.

Referring in detail to the drawings, 5 designates an automobile of any conventional form, and 6, the front wheel axle thereof. The automobile is provided with the usual shock absorbing elliptical springs 7, and upon the wheel axle and the front ends of the springs my improved fender is mounted and supported. This fender comprises a frame, consisting of the parallel side bars 8 and the transverse bars 9, which connect the side bars at their front and rear ends. This frame is hingedly mounted upon the lower ends of the uprights 10, by the hinges 11. These uprights are provided intermediate their ends with the longitudinal slots 12, in which the forward ends of the elliptical springs 7 are received. The uprights are provided with spaced openings 13 to receive the pins or bolts 14, which are also disposed through the front ends of the springs 7 and retain the same in the slots 12. It will be noted that these uprights are each provided with two sets of openings 13 so that the fender may be applied to different makes of automobiles in which the distance between the vehicle axle and the ends of the springs vary. The uprights 10 extend below the rear transverse bar 9 and to the lower ends of said uprights the rearwardly extending bars 15 are secured. The lower ends of the uprights are connected by the transverse brace bar 16 and truss bars 17 are secured to the bars 15 and the lower ends of the uprights. The rear ends of the bars 15 are connected by a cross bar 18, which is secured to the upper bifurcated ends of the blocks 19, the lower ends of which receive the bars 15. Similar blocks 20 are arranged upon the ends of the cross bar 18 and the upper bifurcated ends thereof receive the axle 6 of the automobile. Bolts 21 are disposed through the arms of said blocks above the axle to retain the same thereon.

Diagonal brace bars 22 are provided at the sides of the main frame of the fender, the lower ends of said brace bars being secured to the front ends of the outer longitudinal bars 8 of the frame and having their rear ends secured to the vertical posts 23, which are mounted on the ends of the rear transverse bar 9 of said frame. Between the spaced longitudinal frame bars 8, which, together with the bars 9 constitute side frame sections, a spring structure 24 is arranged and to one of the inner bars 8 a central rectangular frame section 25 is hinged, as indicated at 26. This frame also carries the spring structure 27 and is provided with a bolt 28 to engage with a suitable keeper on the main frame.

To one of the uprights 10, a rear or back frame 29 is hinged, as indicated at 30, and this frame also carries a bolt 31 to engage a keeper on the other of the uprights. The frame 29 is further provided with a spring structure 32 of any desired form.

To the forward end of the main frame and at opposite sides thereof the bearing rods 33 are secured and in these bearings suitable trunnions on the ends of the cushioning roller 34 are mounted. This roller is preferably of tubular form and is constructed of rubber, the trunnions being suitably fixed in opposite ends thereof.

Means are provided whereby the main frame of the fender may be readily elevated to an inoperative position from the driver's seat and this means consists of a lever 35, which is pivoted intermediate of its ends upon the lower end of one of the uprights 10, as shown at 36. The forwardly extending portion of this lever is curved, and its extremity is transversely disposed beneath the inner longitudinal bar 8 at one side of the main frame, as indicated in dotted lines at 37 in Fig. 4. Upon the other side of its pivot, the lever is vertically extended and is disposed between a wire loop 38 and a block 39 which is fixed to the rearwardly extending bar 14. This loop acts as a stop and limits the downward movement of the rear end of the lever 35. A connecting rod 40 connects this lever to an operating lever which is mounted upon the automobile adjacent to the driver's seat (not shown).

From the above description and inspection of the accompanying drawings, it is thought that the construction and operation of my improved fender may be readily understood. The rear or back frame 29 may be readily swung outwardly and to one side, so that the operator can conveniently reach the starting crank of the engine. The other of the frames 25, which is mounted in the main frame structure, may also be swung upwardly to a vertical position, so that the operator may have access to the under side of the machine at the front thereof. The diagonal rods or bars 22 at the sides of the main frame serve to prevent a person from rolling off of the frame at the sides thereof. The cushioning springs in the rear or back frame 29 will also obviate all liability of injury to the person struck by the machine.

When it is desired to elevate the main frame of the fender, the operator simply manipulates a lever to pull upon the connecting rod and actuate the lever 35 to force the rear end thereof downwardly whereupon the main frame carrying the auxiliary frame 25 will be swung upwardly to the position shown in Fig. 2. Thus, the fender is greatly condensed and rendered inconspicuous.

The device is much simpler than the fender disclosed in my former application hereinbefore referred to and also has the additional feature of the movable main frame. Suitable stop blocks 41 are secured to the under side of the main frame at its hinged end and bear against the lower ends of the uprights 10 when the main frame is in its horizontal or operative position, so as to provide additional means of support for the frame under the weight thereon and relieve the hinges which connect the same to the uprights of considerable strain.

It will be obvious that by means of the foregoing improvements, the entire device may be constructed at greatly reduced cost and that the fender produced is extremely durable and highly efficient in practical use.

While I have shown and described but the preferred structure and arrangement of this device, it will be understood that the same is susceptible of many minor changes in the details of construction without departing from the principles of the invention.

Having thus described my invention, what I claim as new and desire to secure by Letters-Patent is:

A fender comprising spaced uprights, rearwardly extending bars secured to the lower ends of said uprights, a transversely disposed bar and means for mounting the same upon a vehicle axle, hangers secured to the latter bar in which the ends of said rearwardly extending bars are mounted, an impact receiving frame hinged upon the lower ends of the uprights and extending in advance thereof, said frame including side sections and a relatively movable central section, a lever pivotally mounted upon the lower end of one of the uprights and having a forwardly extending portion, the extremity of which extends beneath said movable frame section, cushioning means movably mounted upon the uprights and normally disposed between the same, and operating means connected to the lever to actuate the same and move the forwardly extending frame to a vertical position upon the uprights.

In testimony whereof I hereunto affix my signature in the presence of two witnesses.

FRANK MEATTAUER.

Witnesses:
I. B. LUBBOCK,
F. E. RAGLAND.

Copies of this patent may be obtained for five cents each, by addressing the "Commissioner of Patents, Washington, D. C."